July 10, 1951 H. E. SUHRE 2,559,686
EXTENSIBLE HACK SAW FRAME
Filed Oct. 26, 1945 2 Sheets-Sheet 1
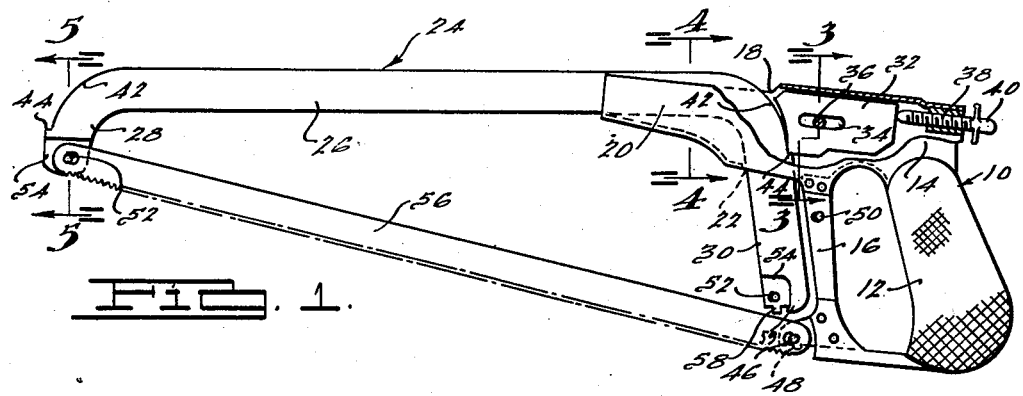
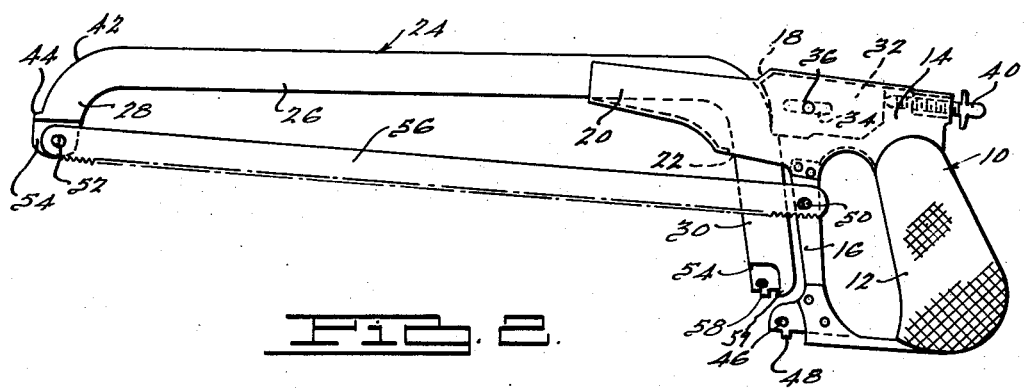
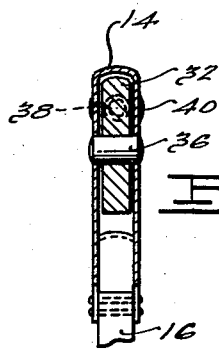
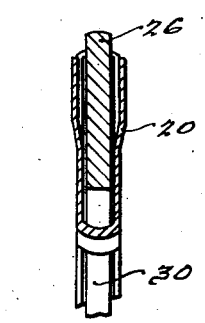
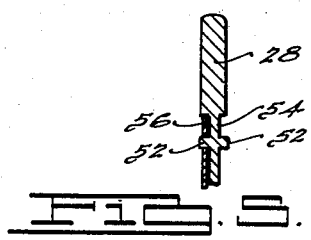
INVENTOR.
Henry E. Suhre.
BY
Maxwell K. Murphy
ATTORNEY.

July 10, 1951  H. E. SUHRE  2,559,686
EXTENSIBLE HACK SAW FRAME
Filed Oct. 26, 1945  2 Sheets-Sheet 2
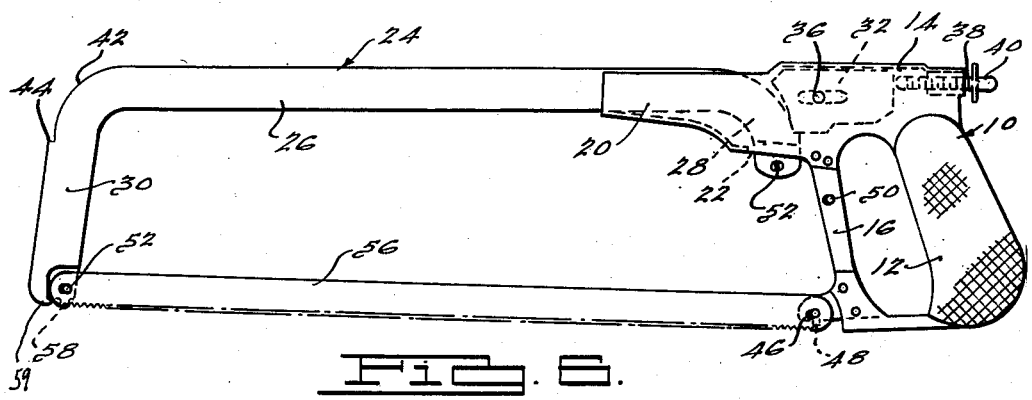
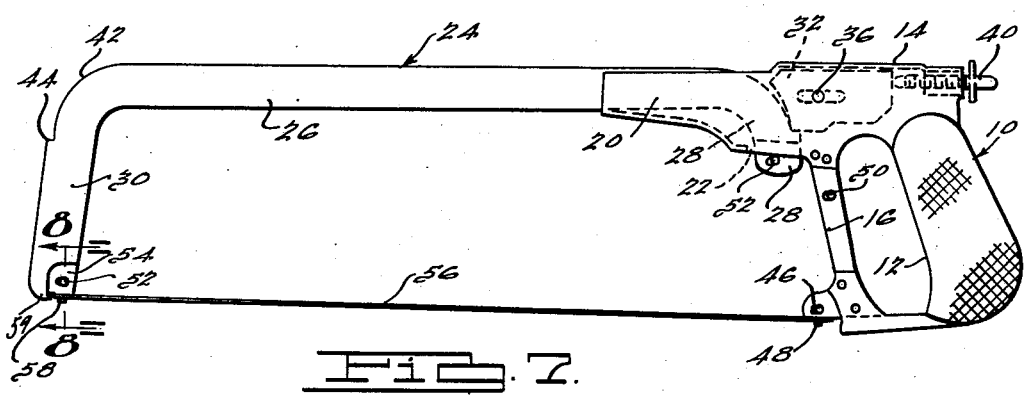
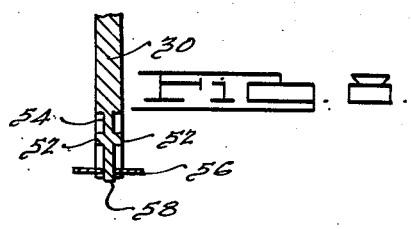
INVENTOR.
Henry E. Suhre.
BY
Maxwell K. Murphy
ATTORNEY.

Patented July 10, 1951

2,559,686

UNITED STATES PATENT OFFICE 2,559,686

EXTENSIBLE HACK SAW FRAME

Henry E. Suhre, Pueblo, Colo.; Olivia S. Des Champs conservatrix of said Henry E. Suhre Application October 26, 1945, Serial No. 624,652

9 Claims. (Cl. 145—34)

This invention relates to a hack saw and more particularly to a novel frame for supporting the blade in various positions to suit the work with which the saw is to be used.

An object of the invention is to provide a handle associated with a reversible frame portion having depending end portions of different length to which may be attached one end of the hack saw blade whereby the blade is positioned in a vertical position and extends at an angle to the hack saw frame or when the frame is reversed the blade extends parallel to the frame.

Another object of the invention is to provide means for supporting the blade in a horizontal position relative to the frame with the saw teeth directed toward the left or right so that horizontal cuts may be made with the frame in a vertical position.

A further object of the invention is to attach the blade in the nose portion of the saw so as to permit flush cuts to be made when the blade is in a vertical plane.

A further object of the invention is to provide a semi-floating tightening device for the blade cooperating between the frame portion and the handle for tensioning the blade.

Other objects and advantages of the invention, as well as in the combination and arrangement of the several parts, will be more fully understood from the following description taken in connection with the accompanying drawings, in which:

Fig. 1 is a side elevational view of my improved hack saw, showing one position of the reversible frame, parts being broken away and in section;

Fig. 2 is a view corresponding to Fig. 1 but showing the blade in another position on the handle;

Fig. 3 is a sectional view taken on line 3—3 of Fig. 1;

Fig. 4 is a sectional view taken on line 4—4 of Fig. 1;

Fig. 5 is a sectional view taken on line 5—5 of Fig. 1;

Fig. 6 is a view corresponding to Fig. 1 but showing the frame in a reversed position;

Fig. 7 is a view corresponding to Fig. 6 but showing the blade in a horizontal position; and Fig. 8 is a sectional view taken on line 8—8 of Fig. 7.

Referring to the drawing, I have shown a handle 10 having a grip portion 12, tubular top portion 14 and a brace portion 16. The tubular portion 14 has a portion of its top cut away as at 18, at its forward end to provide a channel portion 20. The base of the channel 20 is provided with an opening 22.

A frame 24 has a longitudinally extending portion 26 with downwardly extending end portions 28 and 30. As shown in Figs. 1 and 2, the outer end 28 is relatively short and the inner end 30 is longer shown extended through the opening 22 in the base of the channel. The longitudinally extending portion 26 is received in the channel 20.

Mounted within the tubular portion 14 is a sliding block 32 having a slot 34 which receives a guide and keeper pin 36 secured to the side walls of the tubular portion 14. A screw threaded member 38 is threaded in the end of the tubular member and has its inner end in engagement with the rear end of the sliding block 32. The outer end of the threaded member 38 is provided with a grip 40 for manually turning the threaded member toward and away from the block 32. This may be in the form of a speed spindle for expediting the operation of loosening and taking up slack.

The edges of the frame 24, adjacent its opposite ends are curved, as at 42, and are provided with shoulders 44. The outer end face of the block 32 is correspondingly shaped to fit against the end of the frame 24 and the bottom edge of the block engages the shoulder 44 when in holding position. Thus, when the frame is in position, as illustrated in Fig. 1, and the threaded member 38 is turned inwardly to move the block 32 forwardly, the frame is forced forwardly and is prevented from upward movement by the block 32 being in engagement with the shoulder 44. It is to be understood, however, that the opening 22 is of sufficient size to not prevent forward movement of the frame 24 relative to the channel 20 but that the forward movement of the frame 24 is limited by the tension on the blade when in position as later explained more fully.

At the lower edge of the handle and near the upper end of the brace 16, are transversely extending pins 46 and 50, and preferably these pins project in both directions from said handle and brace. A downwardly extending projection 48 is arranged on the handle adjacent the pin 46.

The ends of each downwardly extending portion 28 and 30 are provided with outwardly projecting pins 52 and 51', respectively. The extremities of the downwardly extending portion 28 and 30 are oppositely reduced in thickness as shown at 54 in Fig. 5. This reduced thickness allows the saw to be admitted into a narrower opening than the conventional saw permits. At each side the thickness of the end portion has been reduced substantially the thickness of the hack saw blade 56 to provide a flush surface between the outer faces of the blade 56 and the frame 24. This permits flush cuts to be made without interfering projections. The end of one of the downwardly extending portions, as shown on the extension 30, is a downwardly extending projection 58. A further extending end portion 59 protects the extending projection 58 from breakage.

The projecting pins 52 are positioned near the outer edge of the downwardly extending portions 28 and 30. This arrangement permits a cut to be made close to an obstruction with small strokes.

Referring now to the arrangement of parts illustrated in Fig. 1, the frame has been placed with its longer end 30 received in the channel 20 and opening 22. The saw blade 56, having openings at its opposite ends, has one opening over the pin 52 at the short end 28 of the frame and the opening at the opposite end of the blade is received over the pin 46 carried by the handle at its lower portion. By tightening up on the screw threaded member 38, the block 32 is urged into engagement with the rear edge of the frame 24 forcing the latter to apply a tension on the blade with the lower edge of the block 32 preventing upward movement of the frame by its engagement with the shoulder 44. In this arrangement of the device, the saw cut may be started in a limited space and allowing for depth as the cut deepens.

Fig. 2 shows the parts arranged for a quarter depth of the blade by positioning the rear end of the blade over the lateral pin 50 on the brace 16.

Referring now to Figs. 6 and 7, the frame 24 has been assembled reversely to its position shown in Figs. 1 and 2, that is, the short end 28 is received in the channel 20. Thus the saw can be used as a conventional saw by end reversal of the frame 24.

The semi-floating tightening device, comprising the slidable block 32 and screw threaded member 38, is located at the top of the saw, away from the seat of operation, a distinct advantage over the conventional saw in that it does not interfere with the work to be done.

It will be understood that various changes including the size, shape and arrangement of parts may be made without departing from the spirit of my invention and it is not my intention to limit its scope other than by the terms of the appended claims.

I claim:

1. A hack saw comprising a handle having a longitudinally-extending recess at its upper end, said recess having an elongated opening through its bottom, a frame comprising a body having downturned portions at its opposite ends, the opposite downturned ends of said frame being alternatively receivable in said recess to project downwardly through said opening with the remainder of said frame projecting longitudinally from said handle, means on said handle and below said recess engageable with one end of a saw blade, means at each end of said frame alternatively engageable with the other end of said blade, and means longitudinally shiftably mounted in said recess and cooperable with the portion of said frame received in said recess to retain said frame portion against removal from said recess and to urge said frame longitudinally away from said handle blade-engaging means.

2. The structure of claim 1 in which said shiftable means engages the portion of said frame received in said recess in at least two planes to exert thereagainst a force having a component in the direction of projection of said downturned portion and a component in the direction of projection of said body.

3. The structure of claim 1 in which each of said downturned frame portions is provided with an upwardly-presented shoulder selectively engageable, by said shiftable means.

4. The structure of claim 1 in which the contiguous surfaces of said downturned portion and said shiftable means are curved.

5. A hack saw comprising a handle formed to provide a longitudinally-extending tunnel and having a portion depending below said tunnel, said tunnel being provided with an opening in its upper wall, said opening extending inwardly from one end of said tunnel and an elongated opening in the lower wall of said tunnel, a frame having an elongated body with downturned portions at its opposite ends, the opposite ends of said body being selectively enterable in said tunnel through said opening in the upper wall thereof, and the selected downturned portion being simultaneously projectible through said opening in the lower wall thereof, a follower longitudinally shiftably mounted in said tunnel in cooperative relation with the selected downturned portion, and screw means mounted in said tunnel and projecting therefrom, said screw means being co-operable with said follower to press the same against said selected portion to urge said frame longitudinally of said tunnel.

6. The structure of claim 1 in which said downturned portions are of unequal length, and wherein more than one means is provided on said handle and below said recess selectively engageable with one end of a saw blade.

7. A hack saw comprising a handle portion, a reversible frame portion having end portions depending in the same direction from said frame portion, means at the free ends of said depending end portions for alternatively receiving one end of a saw blade, said handle portion providing a channel portion having an opening in the bottom thereof for selectively receiving either of said depending portions, adjustable positioning means shiftable in said channel portion and cooperative with the selected depending frame portion for holding said frame on said handle, and means on said handle for receiving the opposite end of the saw blade.

8. A hack saw according to claim 7 wherein said depending end portions are of unequal length.

9. In a hack saw having a blade-carrying frame inclusive of a handle for manipulating the frame and the associated blade in a sawing action, the improvement which comprises a plurality of recesses in a side of the frame arranged to receive the opposite ends of a hack saw blade, each said recess being of a depth corresponding to the thickness of a hack saw blade so that the outer surface of the blade will be flush with the frame when the blade is in position in said recesses, and fastening means associated with each said recess for holding a blade in place therein.

HENRY E. SUHRE.

REFERENCES CITED

The following references are of record in the file of this patent:

UNITED STATES PATENTS

| Number | Name | Date |
|---|---|---|
| 257,802 | Woodrough | May 9, 1882 |
| 1,470,897 | Voltz | Oct. 16, 1923 |
| 1,497,135 | Cunneen | June 10, 1924 |
| 1,498,995 | Bowe | June 24, 1924 |
| 1,835,638 | Cunneen | Dec. 8, 1931 |
| 2,320,511 | Curry | June 1, 1943 |